United States Patent [19]

Higuichi

[11] Patent Number: 4,689,529

[45] Date of Patent: Aug. 25, 1987

[54] LINEAR STEPPING MOTOR

[75] Inventor: Toshiro Higuichi, Yokohama, Japan

[73] Assignee: Nippon Seiko Kabushiki Kaisha, Tokyo, Japan; a part interest

[21] Appl. No.: 804,167

[22] Filed: Dec. 3, 1985

[51] Int. Cl.⁴ .............................................. H02K 41/00
[52] U.S. Cl. ..................... 318/135; 104/281; 104/282; 104/284; 310/12
[58] Field of Search .................... 310/12-14; 318/135; 104/281-284

[56] References Cited

U.S. PATENT DOCUMENTS

| | | | |
|---|---|---|---|
| 3,376,578 | 1/1968 | Sawyer | 346/29 |
| 3,638,093 | 1/1972 | Ross | 310/12 X |
| 3,717,103 | 2/1973 | Guderjahn | 104/281 X |
| 3,736,880 | 6/1973 | Ross | 104/282 |
| 3,771,033 | 11/1973 | Matsui | 318/135 X |
| 3,787,716 | 1/1974 | La France | 318/135 X |
| 3,829,746 | 8/1974 | Vay | 310/12 X |
| 3,872,357 | 3/1975 | Maki | 318/135 X |
| 3,968,753 | 7/1976 | Brettling | 104/284 X |
| 4,013,280 | 3/1977 | Chitayat et al. | 269/60 |
| 4,055,123 | 10/1977 | Heidelberg | 104/282 X |
| 4,072,110 | 2/1978 | Jayawant | 104/284 |
| 4,140,063 | 2/1979 | Nakamura | 104/284 |
| 4,259,908 | 4/1981 | Feistkurn | 104/281 |
| 4,372,223 | 2/1983 | Iwatani | 108/143 |
| 4,581,553 | 4/1986 | Moczala | 310/12 |
| 4,887,472 | 5/1986 | Steinmetz | 310/12 X |

Primary Examiner—Donovan F. Duggan
Attorney, Agent, or Firm—Shapiro and Shapiro

[57] ABSTRACT

There is disclosed a linear stepping motor provided with a stationary member; a movable member having a face opposed to the stationary member; a first magnetic device for suspending the movable member in a floating state by magnetic attractive force with respect to the stationary member; a second magnetic device for magnetically displacing the movable member with respect to the stationary member; and a control device for controlling the first and second magnetic devices to determine the position of the movable member with respect to the stationary member.

7 Claims, 9 Drawing Figures

LINEAR STEPPING MOTOR

BACKGROUND OF THE INVENTION

1. Field of the Invention

The present invention relates to a linear stepping motor provided with a driving-guiding mechanism for maintaining a movable member in noncontact state by means of attractive force of electromagnets and also driving and guiding the movable member.

2. Description of the Prior Art

For achieving a linear movement, there has conventionally been employed a device in which a table, provided with a guide mechanism involving mechanical contact and a driving mechanism utilizing a ball screw on a motor shaft, is moved for example on a stationary surface plate. Such a device inevitably generates dust particles by abrasion, since the frictional contact of component parts is unavoidable. The dust particle generation is a major problem in case such a device is used in a clean room as a positioner or a conveyor for precision work such as manufacturing of integrated circuits.

Thus, in order to eliminate the mechanical contact, there has been proposed a fluid pressure guide, in which pressurized fluid such as oil or air is present between a stationary part and a movable part and maintains a small gap therebetween by the static pressure of said fluid. Such a guide is driven for example by a linear motor and is free from the drawback of dust particle generation.

However the above-explained fluid pressure guide is still associated with the following problems:

(1) As the distance between the stationary part and the movable part is generally as small as 5–10 μm, the mutually opposed surfaces thereof have to be entirely finished with a very high precision;

(2) In case of use in a clean room, dust and moisture have to be sufficiently removed from the fluid, since they may accumulate in the mechanism, thus hindering the function thereof, causing corrosion of various parts and contaminating the atmosphere in the clean room; and (3) The above-explained mechanism utilizing static fluid pressure cannot be employed in an apparatus to be used in vacuum, such as the apparatus for laser beam machining or electron beam machining.

SUMMARY OF THE INVENTION

In consideration of the foregoing, an object of the present invention is to provide a linear stepping motor provided with a non-contact driving-guiding mechanism, which is featured by a simple structure not requiring very high overall precision, is free from dust particle generation and can be used in a clean room or in vacuum.

The above-mentioned object can be achieved, according to the present invention, by a linear stepping motor comprising a stationary member; a movable member having a face opposed to said stationary member; first magnetic means for suspending said movable member in a floating state with respect to said stationary member by means of magnetic attractive force; second magnetic means for magnetically displacing said movable member with respect to said stationary member; and control means for controlling said first and second magnetic means to determine the position of said movable member with respect to said stationary member.

According to the present invention, the mutually opposed surfaces of the movable and stationary members need not be finished with a very high precision, since the movable member is magnetically suspended in space, driven and guided to achieve a highly precise movement while a relatively large gap is maintained between the movable and stationary members. Also the absence of mechanical contact and fluid eliminates the dust particle generation, thus allowing the use as a positioner or a conveyor in a clean room or also in vacuum. Also the use in a gravity-free state is possible if the magnetic attractive force is balanced by another force. Also the driving and guiding are achieved by mere attractive force on a magnetic material facing the magnetic generators, and such a simple structure enables to dispensing with additional magnets or the like which are required in magnetic floating apparatus utilizing magnetic repulsive force.

DETAILED DESCRIPTION OF THE PREFERRED EMBODIMENTS

Figure 1:
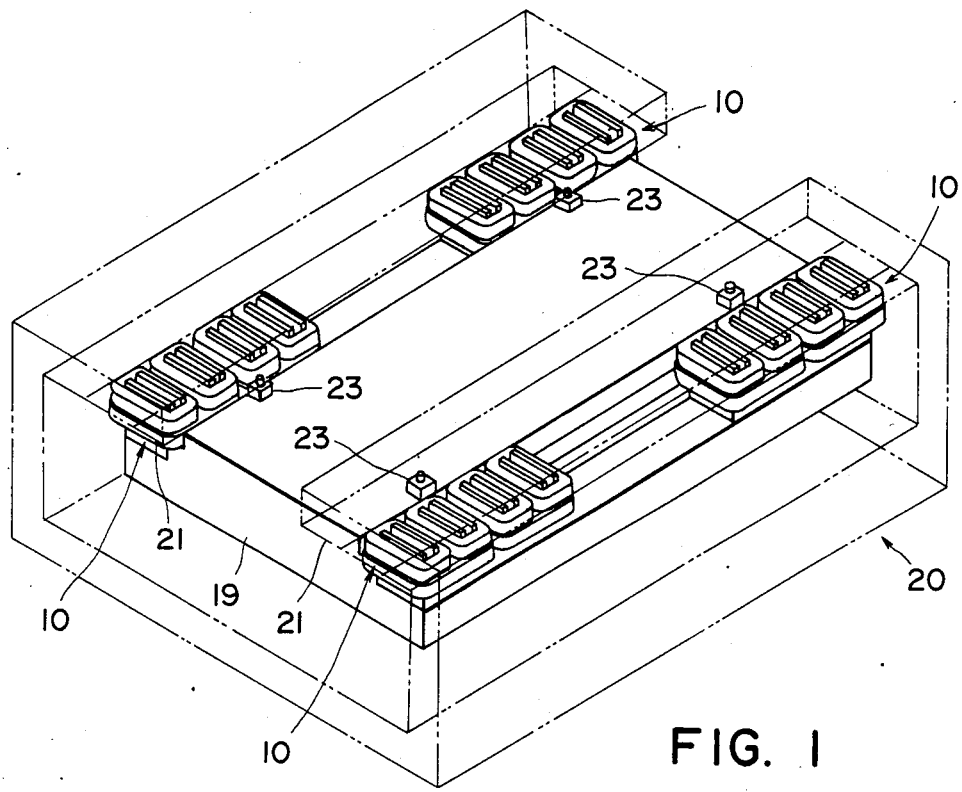
FIG. 1 is a perspective view of a linear stepping motor constituting a first embodiment of the present invention.

FIG. 1 shows a linear stepping motor constituting a first embodiment of the present invention, wherein a movable member 19 is suspended in space by attractive force of four magnetic devices 10 in a groove of a stationary member 20, and is moved along the longitudinal direction thereof.

The stationary member 20 is composed of a magnetic material and is extended with a square C-shaped (⊐) cross section to accommodate the movable member 19 in the groove thereof. As shown in FIGS. 3 to 6, two upper portions of the stationary member 20, divided in the center thereof, are provided, on the lower faces thereof, with a plurality of transvers teeth 22 extended over a predetermined width and positioned at a predetermined pitch. Inside the rows of said teeth 22 there are provided flat surfaces serving as reference planes 21 for gap measurement with displacement sensor 23 which will be explained later.

Figure 2:
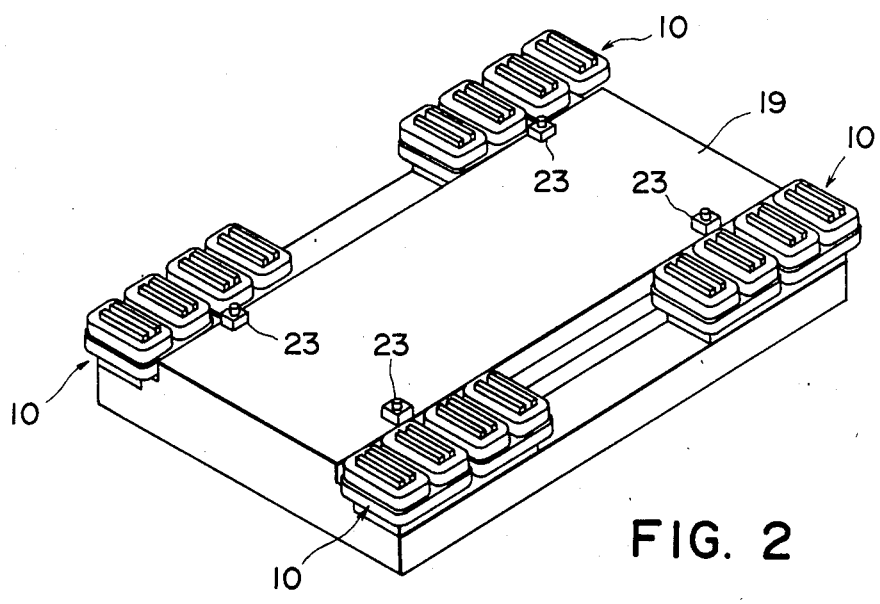
FIG. 2 is a perspective view of a movable member shown in FIG. 1.

As shown in FIG. 2, the movable member 19 is extended with a T-shaped (⊤) cross section matching the groove of the stationary member 20, and is provided, at the corners thereof, with four magnetic devices 10 facing the rows of said teeth 22 of the stationary member 20 and with four displacement sensors 23 positioned adjacent to said magnetic devices and facing said reference planes 21.

Figure 3:
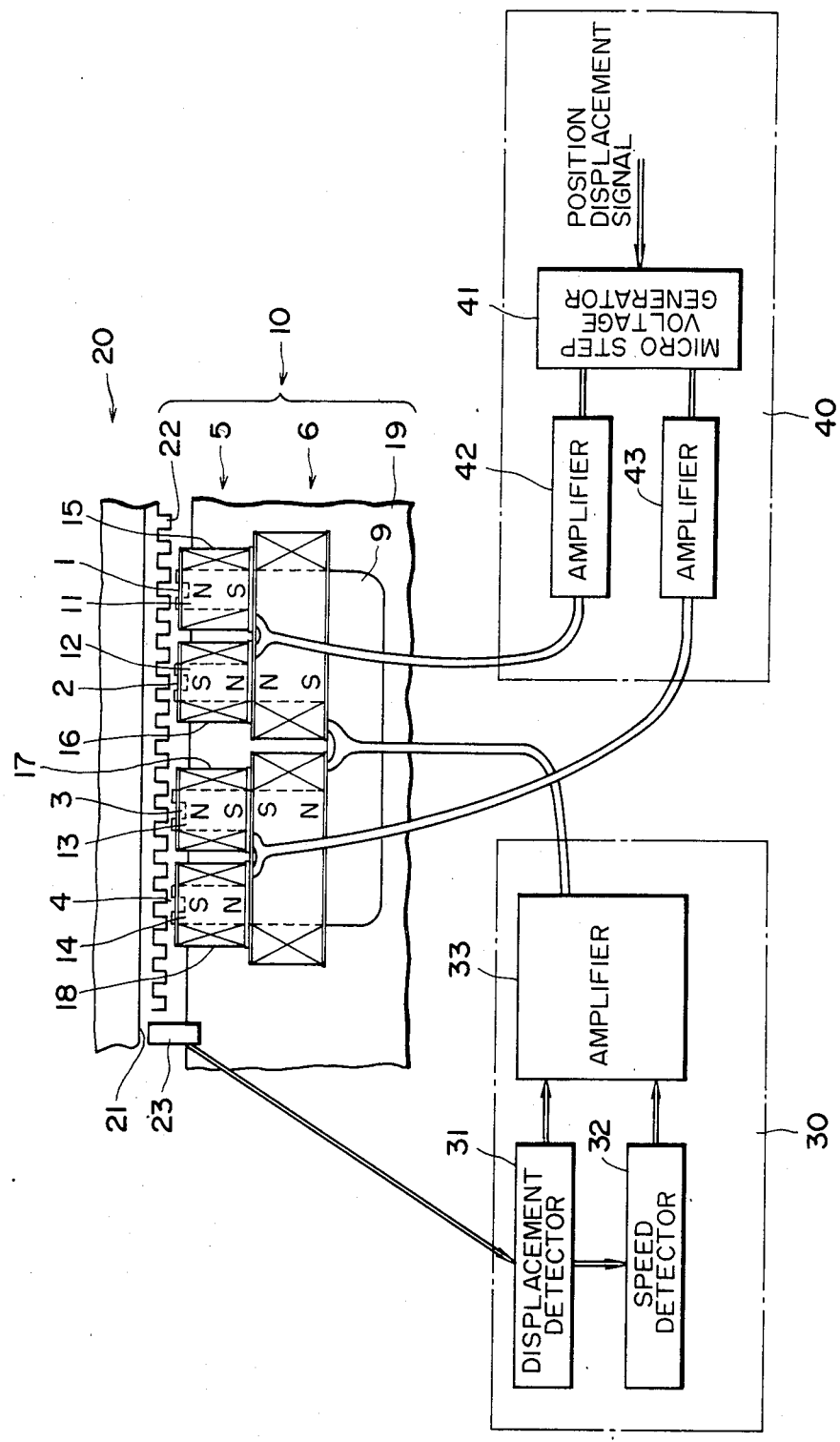
FIG. 3 is a block diagram showing the control method of the magnetic devices shown in FIG. 1.
Figure 4:
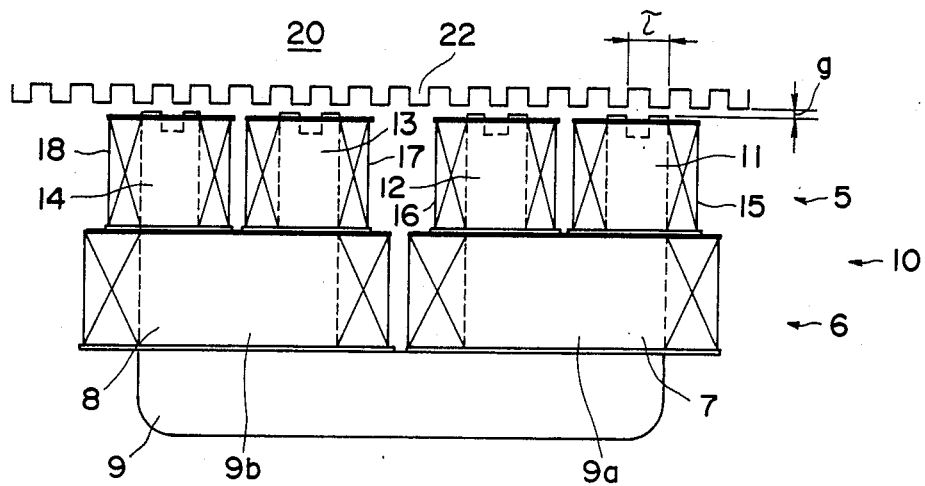
FIG. 4 is a detailed view of a part of the magnetic devices shown in FIG. 1.
Figure 5:
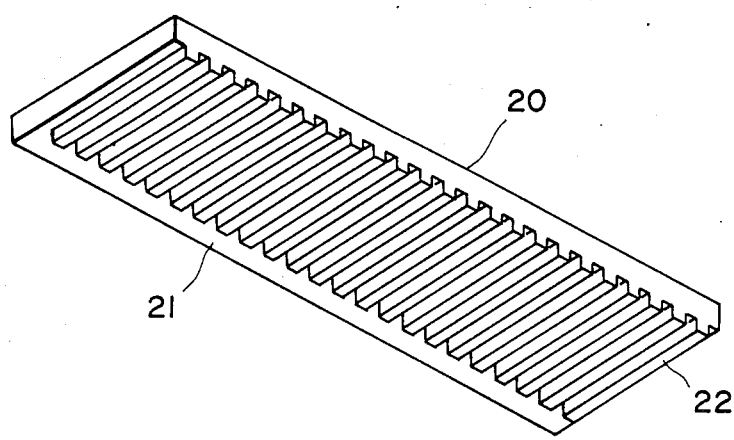
FIG. 5 is a perspective view of magnetic devices and teeth of a stationary member shown in FIG. 1.
Figure 5:
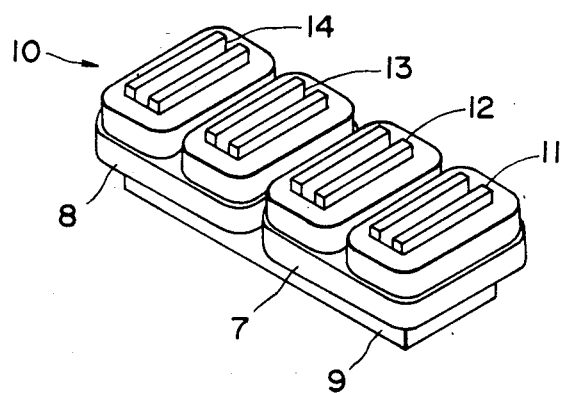

As shown in FIG. 3, each magnetic device 10 is composed of magnetic poles 5 for driving and guiding the the movable member 19 and magnetic poles 6 for suspension by attractive force. The magnetic poles 5, 6 are controlled respectively by control devices 30, 40 positioned in a stationary part outside the movable member 19. The displacement sensors 23 are fixed on the movable member 19, adjacent to the magnetic devices 10 with the detecting faces being directed toward the reference planes 21 of the stationary member 20. The signals obtained from the displacement sensors 23 are supplied to the control device 30.

Figure 6:
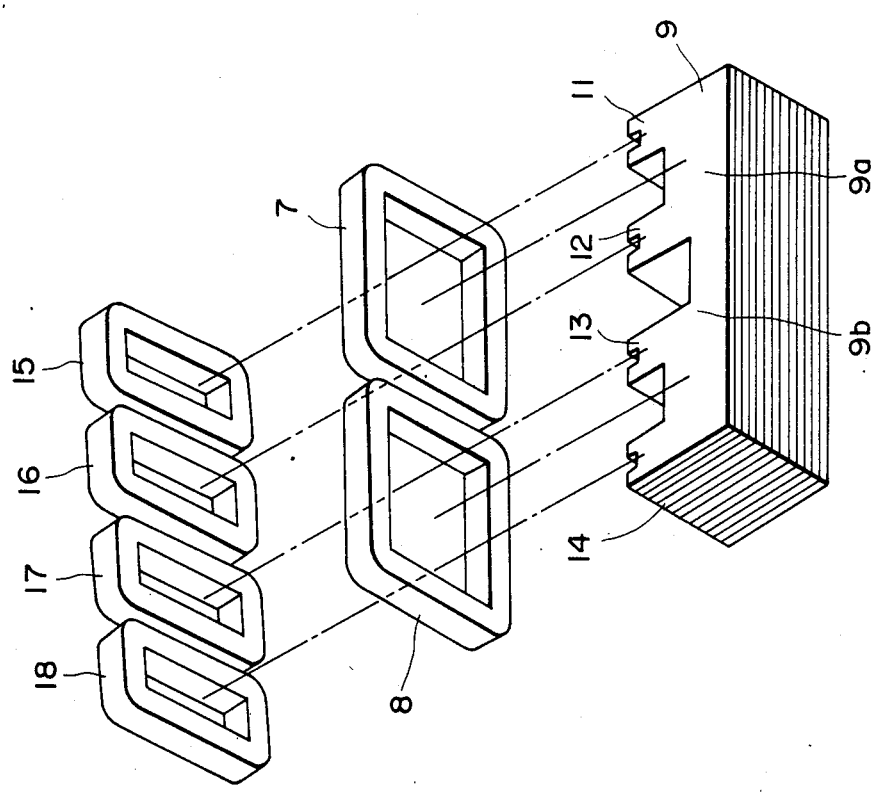
FIG. 6 is an exploded perspective view of the magnetic devices shown in FIG. 1.

As shown in FIG. 6, the magnetic device 10 is composed of a core member 9; main flux coils 7,8 wound on said core member and forming magnetic pole group 6; and driving coils 15, 16, 17, 18 forming magnetic pole group 5 composed of magnetic poles 1, 2, 3 and 4.

The core member 9 is composed of a laminate structure of magnetic steel plates punched to form two C-shapes that are laterally connected. The core member 9 may also be composed of an integral magnetic material, but the above-mentioned laminate structure of steel plates allows easier and inexpensive manufacture, with a reduced eddy current loss. Around the two C-shapes 9a, 9b of the core member 9, there are serially wound main flux coils 7, 8 in such a manner as to exhibit mutually opposite polarity, for example as shown in FIG. 3, thus forming the magnetic pole group 6. When the main flux coils 7, 8 are energized, a magnetic field is generated between the main flux coils 7 and 8 to exert attractive force between the stationary member 20 and the movable member 19. A similar effect can be obtained by winding the main flux coils 7, 8 longitudinally on a portion connecting two C-shaped portions.

The core member 9 is provided with projections constituting a first pole piece 11, a second pole piece 12, a third pole piece 13 and a fourth pole piece 14 on which are respectively wound driving coils 15, 16, 17 and 18 to constitute a first magnetic pole 1, a second magnetic pole 2, a third magnetic pole 3 and a fourth magnetic pole 4. In the present embodiment, the driving coils 15 and 16, or 17 and 18 are serially connected in such a manner that they exhibit mutually opposite polarities, as shown in FIG. 3. However they may also be so connected in parallel as to exhibit mutually opposite polarities.

Each of said pole pieces 11, 12, 13 and 14 is provided with two teeth respectively facing the teeth 22 of the stationary member 20, and the pitch $\tau$ of the teeth of each pole piece is the same as that of the teeth 22 of the stationary member 20. With respect to the position of the teeth on the first pole piece 11, measured at the center of teeth, the teeth on the second pole piece 12 are displaced by $l\tau + \frac{1}{2}\tau$, those on the third pole piece 13 by $m\tau \pm \frac{1}{4}\tau$, and those on the fourth pole piece 14 by $n\tau \mp \frac{1}{4}\tau$, wherein l, m and n are integers. In the present embodiment each pole piece is provided with two teeth, but the number of teeth may be arbitrarily selected. The gap g between said teeth and the teeth 22 of the opposed stationary member is generally controlled in a range from 0.3 to 0.5 mm.

The above-described magnetic devices 10 are controlled in the following manner.

As shown in FIG. 3, the direction of attraction is controlled by the magnetic pole group 6, control device 30 and displacement sensors 23. The displacement sensor 23 measures the variation in the gap between the movable member 19 and the stationary member 20, and provides a displacement detector 31 with a corresponding variation signal. The displacement detector 31 transmits the signal from the displacement sensor 23 to a power amplifier 33, and the gap is controlled by a current obtained therefrom. Also the displacement detector 31 supplies the signal from the displacement sensor 23 to a speed detector 32, and the displacing speed obtained therein is supplied to the power amplifier 33 to achieve stable gap control. The power amplifier 33 is also provided with a resistor for detecting the variation in the coil current, thereby enabling further stabilized control.

On the other hand, the magnetic pole group 5 for driving and guiding is controlled by the control device 40.

The motor driving is achieved by micro step driving, in which current is so controlled that the ratio of the current $I_A$ in the coils 15, 16 to the current $I_B$ in the coils 17, 18 is smoothly changed to reach a determined value at a target stop position. In response to a position instruction supplied for example from a computer (not shown) a microstep voltage generator 41 supplies an amplifier 42 with a current $I_A$ varying according to a sine curve, and another amplifier 43 with a current $I_B$ varying according to a cosine curve. The amplifiers 42, 43 supply amplified currents respectively to the coils 15, 16 and 17, 18.

FIG. 3 shows a state in which the magnetic pole 1 receives the strongest force. The movable member 19 is moved to the right if the above-mentioned state is generated in the sequence of magnetic poles 3, 2 and 4, or is moved to the left if said state is generated in the sequence of magnetic poles 4, 2 and 3.

Although the attractive force changes by a change in the current in each magnetic pole, $|I_A|$ increases when $|I_B|$ decreases because of a difference in phase between the currents $I_A$ and $I_B$. Consequently the change in the attractive forces of the magnetic poles 1, 2, 3 and 4 is much smaller than the attractive force generated by the main flux coils 7 and 8.

Figure 7:
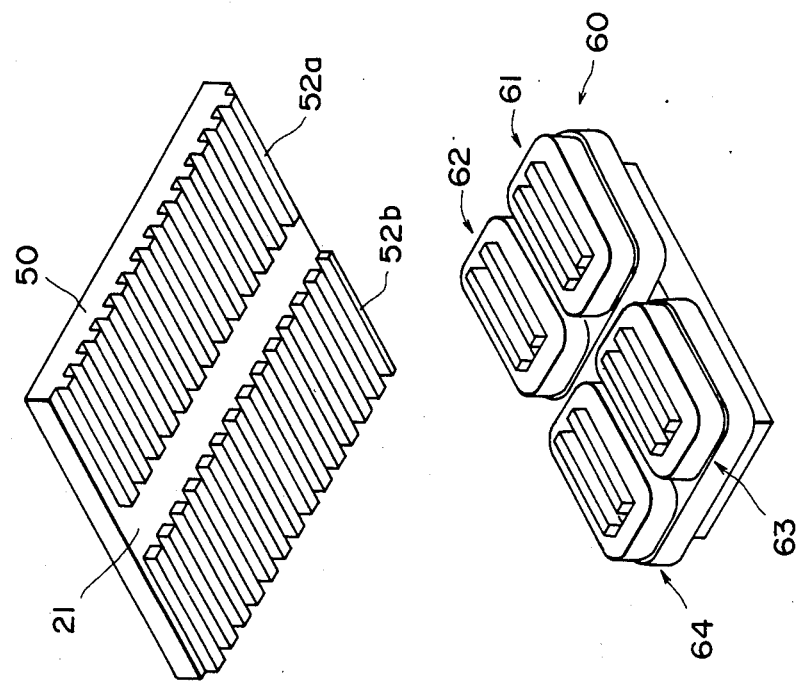
FIG. 7 is a perspective view showing a variation of the magnetic devices.

In contrast to the linear arrangement of the magnetic poles 1, 2, 3 and 4 in the foregoing embodiment, the magnetic poles 1, 2 may be positioned parallel to the poles 3, 4 as shown in FIG. 7. In a magnetic device 60, first and second serial magnetic poles 61, 62 are positioned parallel to third and fourth magnetic poles 63, 64 which are likewise serially connected. In this case the teeth of the pole piece 61 or 62 are aligned with those of the parallel pole piece 63 or 64, so that these teeth are displaced in phase by $\tau/4$ to the rows 52a, 52b of teeth of the opposed stationary member 50.

In the linear stepping motor of the first embodiment, equipped with four magnetic devices 10 and four displacement sensors 23 with the above-explained structure and function, the position control in the moving direction can be actively achieved by the driving-guiding magnetic poles in each magnetic device, while the position in the vertical direction, position around the moving direction and position around a transverse axis can be actively controlled by the attracting poles in each magnetic device. Also the remaining two degrees of freedom of motion (position in the moving direction and position around a vertical axis) can be passively controlled by selecting the same width of the teeth 22 of the stationary member 20 as that of the teeth of each magnetic device 10 on the movable member 19. Consequently the movable member 19 can smoothly move along the longitudinal direction of the stationary member 20.

In case that the above-described linear stepping motor is used under the influence of gravity, the weight of the movable member 19 is balanced with the attractive force of the main flux coils 7, 8 of the magnetic devices 10. On the other hand, in case that it is used in a gravity-free state, or in case of increasing the rigidity, there may be provided additional solenoids, permanent magnets or magnetic devices for balancing with the attractive force of the above-mentioned magnetic devices 10. Also if enough suspending force cannot be obtained by the magnetic devices 10 alone, supplementary attractive force can be provided by additional solenoids or permanent magnets in the same direction.

Figure 8:
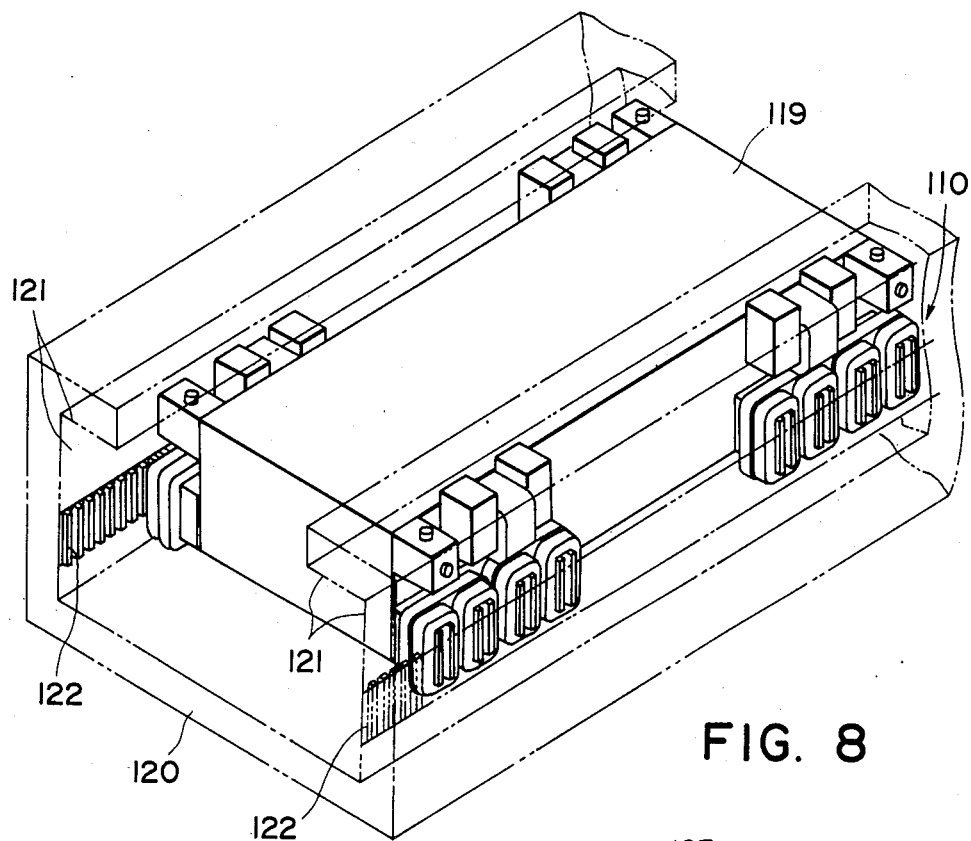
FIG. 8 is a perspective view of a linear stepping motor constituting a second embodiment of the present invention.
Figure 9:
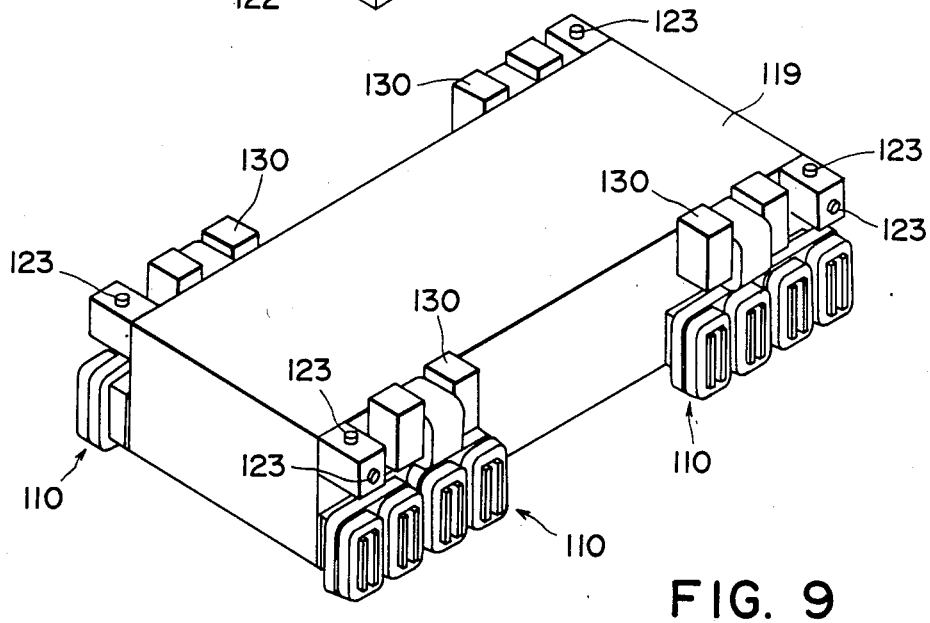
FIG. 9 is a perspective view of a movable member shown in FIG. 8.

FIGS. 8 and 9 illustrate a second embodiment of the present invention.

A stationary member 120 of a square C-shaped cross section, composed also of a magnetic material, is provided with rows of teeth 122 of a pitch $\tau$ on the internal faces of the lateral walls, and reference faces 121 are provided on the upper part of said internal faces and on the bottom face of the upper wall.

A movable member 119 has a rectangular shape, and is provided with four magnetic devices 110 positioned on the corners of lateral faces, four electromagnets 130 positioned respectively above said magnetic devices, and eight displacement sensors 123, two at each corner. The detecting face of each displacement sensor 123 is directed toward the reference face 121 of the stationary member 120. Consequently the variation in gap is measured by four displacement sensors on the upper face, and by two displacement sensors on each lateral face.

The magnetic device 110 is almost the same as the magnetic device 10 in the first embodiment, and is driven on a similar principle. The electromagnet 130 is composed of a coil wound on a C-shaped core member and generates vertical attractive force to actively control the position of the movable member 119 in the vertical direction, position around the moving direction, and position around a transverse axis. The remaining three degrees of freedom of movement, i.e. position in the moving direction, position in the transverse direction and position around a vertical axis can also be actively controlled by four magnetic devices 110. In this manner the linear stepping motor of the present embodiment can actively control all six degrees of freedom of movement.

In contrast to the foregoing embodiments in which the magnetic devices and the rows of teeth are respectively provided on the movable member and the stationary member, it is also possible to achieve similar control by arranging the rows of teeth and the magnetic devices respectively on the movable member and the stationary member.

Although the foregoing embodiments employ four magnetic devices and four displacement sensors, there are needed at least three sets of magnetic devices and displacement sensors for moving the movable member. On the other hand it is also possible to increase the rigidity or improve the precision of control by employing more than four sets of magnetic devices and displacement sensors.

The wave form of the current generated by the microstep voltage generator need not be continuous but can show stepwise changes.

In the foregoing embodiments, the attractive force is solely controlled by the main flux coils, but it is also possible to supply the displacement signal of the displacement sensor to the control device of the driving-guiding coil to regulate the attractive force thereof, thus achieving gap adjustment through the attractive force of the main flux coils and of the driving-guiding coils.

What is claimed is:

1. A linear stepping motor comprising:
   a stationary member and a movable member having mutually opposed faces;
   a row of a plurality of teeth aligned with a determined pitch, said row being provided on said stationary member or movable member between said mutually opposed faces;
   magnetic means comprising a driving-guiding magnetic pole, which is composed of a core member having plural pole pieces positioned at a predetermined pitch and having teeth opposed to the teeth of said row and a driving-guiding coil wound on said core member, and an attractive magnetic pole composed of a main flux coil wound on the core member adjacent to said driving-guiding magnetic pole, said magnetic means being fixed on a face opposed to the face bearing said row of teeth;
   displacement detecting means for detecting a variation in the gap between said stationary and movable members;
   first control means for controlling the attractive force generated by said coil between said stationary and movable members, in response to a detection signal from said detecting means, thereby regulating the gap between said stationary and movable members; and
   second control means for controlling the magnetic field generated by said driving-guiding magnetic pole to drive and guide said movable member.

2. A linear stepping motor according to claim 1, wherein, with respect to the teeth of a first pole piece, those of a second pole piece are displaced by $l\tau + \frac{1}{2}\tau$, those of a third pole piece are displaced by $m\tau \pm \frac{1}{4}\tau$ and those of a fourth pole piece are displaced by $n\tau \mp \frac{1}{4}\tau$, wherein $\tau$ is the pitch of teeth in said row, and l, m and n are integers.

3. A linear stepping motor according to claim 1, wherein said core member is composed of a laminate structure of magnetic steel plates.

4. A linear stepping motor according to claim 1, comprising two rows of teeth positioned on a downward horizontal face of the stationary member;
   two magnetic means fixed on said movable member corresponding to each row of teeth; and
   displacement detecting means directed toward the downward horizontal face of the stationary member, adjacent to each magnetic means.

5. A linear stepping motor according to claim 1, comprising said row of teeth on each of two mutually opposed vertical faces of the stationary member;
   two units of said magnetic means opposed to each row of teeth, wherein a driving-guiding magnetic pole is positioned opposed to each row of teeth and a magnetic pole having a main flux coil is positioned opposed to a downward horizontal face of the stationary member; and
   two displacement detecting means on each of two vertical faces of the stationary member and four displacement detecting means positioned on the downward horizontal face of the stationary member.

6. A linear stepping motor according to claim 1, wherein said second control means is adapted to control the driving-guiding magnetic poles in a microstepping mode.

7. A linear stepping motor comprising:

an elongated stationary member having a plurality of teeth arranged at a pitch $\tau$ transversely of a longitudinal direction of said stationary member;

a movable member having first, second, third and fourth pole pieces arranged in the order named in said longitudinal direction of said stationary member, each of said pole pieces having a plurality of teeth opposed to said teeth of the stationary member and arranged at the pitch $\tau$, wherein said teeth of the second pole piece are located apart by $l\tau + \frac{1}{2}\tau$, those of the third pole piece are located apart by $m\tau \pm \frac{1}{4}\tau$, and those of the fourth pole piece are located apart by $n\tau \pm \frac{1}{4}\tau$, from the respective teeth of the first pole piece, in which l, m and n are integers;

attraction magnetic pole means for maintaining said movable member floated by a magnetic coil providing an attractive force of a magnetic flux passing through a body of the movable member, between the first and the second pole pieces, a tooth portion of the stationary member, a body of the stationary member, between the third and the fourth pole pieces, and said body of the movable member; and guiding magnetic pole means comprising first, second, third and fourth magnetic coils wound on the first, the second, the third and the fourth pole pieces, respectively, said guiding magnetic pole means causing said movable member to move in said longitudinal direction of the stationary member by consecutive and selective energization of said first to fourth magnetic coils in a predetermined order such that the teeth of the pole piece on which the energized magnetic coil is wound align with the teeth of the stationary member.

* * * * *